No. 794,589. PATENTED JULY 11, 1905.
H. CLARK.
KITCHEN CABINET.
APPLICATION FILED DEC. 12, 1904.
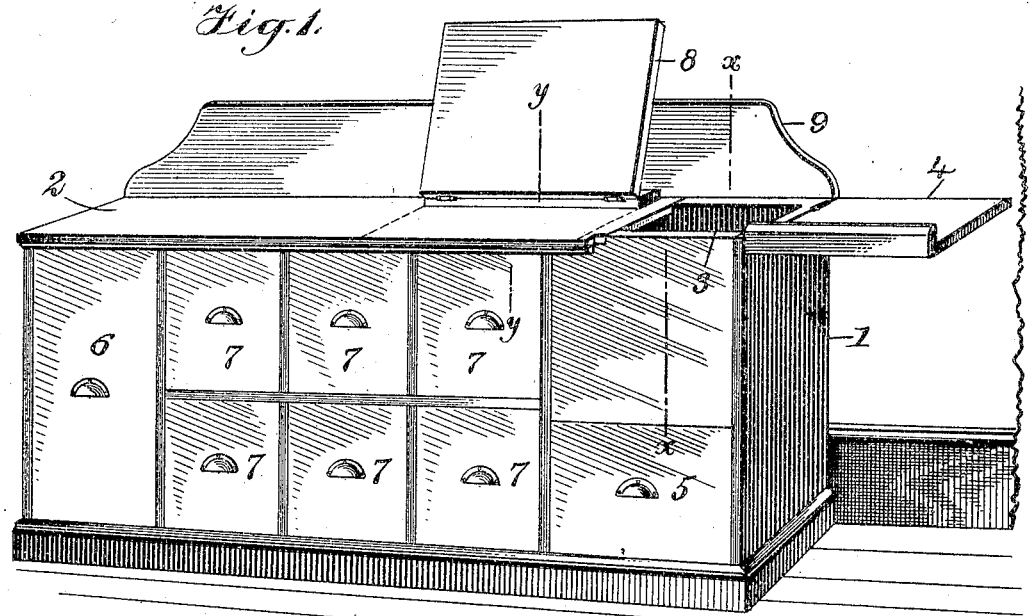
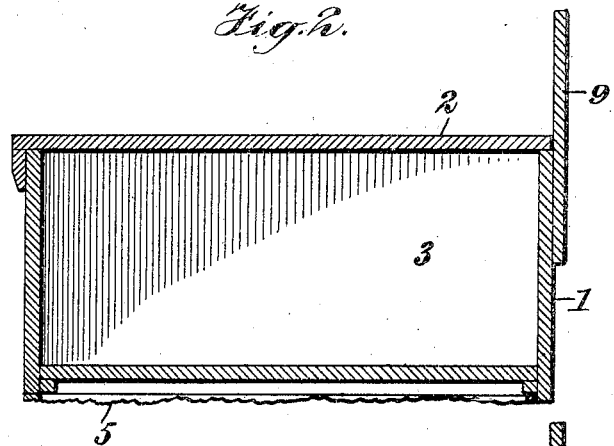
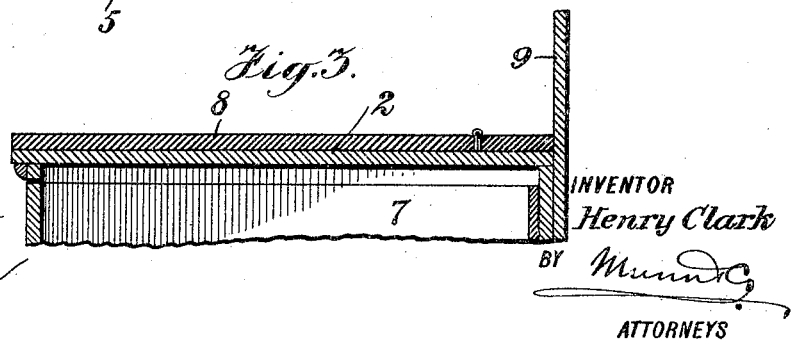
WITNESSES:
INVENTOR
Henry Clark
BY
ATTORNEYS No. 794,589.

Patented July 11, 1905.

UNITED STATES PATENT OFFICE.

HENRY CLARK, OF WHITEFISH, MONTANA.

KITCHEN-CABINET.

SPECIFICATION forming part of Letters Patent No. 794,589, dated July 11, 1905.

Application filed December 12, 1904. Serial No. 236,629.

*To all whom it may concern:*

Be it known that I, HENRY CLARK, a citizen of the United States, and a resident of Whitefish, in the county of Flathead and State of Montana, have invented a new and Improved Kitchen-Cabinet, of which the following is a full, clear, and exact description.

This invention relates to improvements in kitchen-cabinets particularly adapted for the use of pastry-cooks, an object being to provide a kitchen-cabinet of simple and novel construction so arranged that the several ingredients and implements required for use will be conveniently at hand.

I will describe a kitchen-cabinet embodying my invention and then point out the novel features in the appended claims.

Reference is to be had to the accompanying drawings, forming a part of this specification, in which similar characters of reference indicate corresponding parts in all the figures.

Figure 1 is a perspective view of a kitchen-cabinet embodying my invention. Fig. 2 is a section on the line $x\ x$ of Fig. 1, and Fig. 3 is a section on the line $y\ y$ of Fig. 1.

Referring to the drawings, 1 designates the body or casing of the cabinet having a top 2 connected thereto and extended from one end, but terminating inward of the opposite end, thus forming an opening to a flour-bin 3, which has a swinging cover 4. Arranged underneath the flour-bin is a drawer 5, and at the opposite end is a drawer 6, which extends from the top to the bottom of the casing, thus providing a convenient storing-place for ladles, pans, and other utensils. Between these drawers 5 and 6 are other drawers 7 for containing articles to be used in pastry. The end of the top 2 adjacent to the flour-bin is to be used as a surface upon which the kneading is to be done. This surface is indicated between the dotted lines shown in Fig. 1, and when not using said surface it may be protected from flies, dust, and the like by means of a cover 8, mounted to swing against the backboard 9. When the cover 8 is in closed position, a pan containing bread or cake may be placed thereon. Of course when the kneading-surface is to be used the cover 8 will be swung back, as indicated in Fig. 1.

It will be noted in Fig. 1 that the top or board 2 extends slightly over the flour-bin, so that a sieve may be placed under the extension to receive flour when cleaning the kneading-board.

Having thus described my invention, I claim as new and desire to secure by Letters Patent—

1. A kitchen-cabinet comprising a casing, a top extending from one end thereof to nearly the opposite end, a flour-bin arranged in said opposite end, a cover therefor, and a cover mounted to swing on the top adjacent to said flour-bin.

2. A kitchen-cabinet comprising a casing, a cover extending from one and terminating inward of the opposite end thus forming an opening to a flour-bin, a swinging cover for said opening, a cover mounted to swing over a portion of the top adjacent to said opening, and a plurality of drawers arranged in the casing.

3. A kitchen-cabinet comprising a casing, a flour-bin in one end thereof, a cover for said flour-bin, a drawer underneath the flour-bin, a drawer at the opposite end of the casing and extending from the top to the bottom thereof, and a plurality of drawers arranged between the two first-named drawers.

4. A kitchen-cabinet comprising a casing, a flour-bin at one end thereof, a swinging cover for said flour-bin, a top extending from one end of the casing to said bin, a backboard on the casing, a cover mounted to swing over a portion of the top adjacent to the flour-bin, and a drawer in the casing at the opposite end to that of the flour-bin, the said drawer extending from the top of the casing to the bottom.

In testimony whereof I have signed my name to this specification in the presence of two subscribing witnesses.

HENRY CLARK.

Witnesses:
LOUIS P. ECKSTEIN,
FRANCIS C. LOWE.